United States Patent
Hagemann et al.

(10) Patent No.: US 9,738,828 B2
(45) Date of Patent: Aug. 22, 2017

(54) OPTICAL CONVERTER FOR HIGH LUMINANCES

(71) Applicant: SCHOTT AG, Mainz (DE)

(72) Inventors: Volker Hagemann, Klein-Winternheim (DE); Peter Nass, Mainz (DE); Yvonne Menke, Mainz (DE); Bernd Hoppe, Ingelheim (DE); Wolfram Beier, Essenheim (DE); Rainer Liebald, Nauheim (DE); Niko Schultz, Essenheim (DE); Guenter Weidmann, Flonheim (DE); Hauke Esemann, Woerrstadt (DE)

(73) Assignee: SCHOTT AG, Mainz (DE)

( * ) Notice: Subject to any disclaimer, the term of this patent is extended or adjusted under 35 U.S.C. 154(b) by 242 days.

(21) Appl. No.: 14/262,064

(22) Filed: Apr. 25, 2014

(65) Prior Publication Data

US 2015/0070907 A1    Mar. 12, 2015

Related U.S. Application Data

(63) Continuation of application No. PCT/EP2012/071069, filed on Oct. 24, 2012.
(Continued)

(30) Foreign Application Priority Data

Oct. 25, 2011 (DE) .......... 10 2011 116 826
Mar. 22, 2012 (DE) .......... 10 2012 005 654

(51) Int. Cl.
*F21V 13/02* (2006.01)
*C09K 11/77* (2006.01)
(Continued)

(52) U.S. Cl.
CPC .......... *C09K 11/7774* (2013.01); *C04B 35/44* (2013.01); *C09K 11/646* (2013.01);
(Continued)

(58) Field of Classification Search
CPC ....... F21V 13/08; F21V 9/16; C09K 11/7706; C09K 11/7774; C09K 11/646
See application file for complete search history.

(56) References Cited

U.S. PATENT DOCUMENTS

2004/0164277 A1    8/2004 Yen et al.
2005/0269582 A1   12/2005 Mueller et al.
(Continued)

FOREIGN PATENT DOCUMENTS

CN    101103088 A    1/2008
CN    101910361      12/2010
(Continued)

OTHER PUBLICATIONS

German Office Action dated Dec. 5, 2012 corresponding to German Patent Application No. 10 2012 005 654.0 with English translation.
(Continued)

*Primary Examiner* — Andrew Coughlin
(74) *Attorney, Agent, or Firm* — Ohlandt, Greeley, Ruggiero & Perle, L.L.P.

(57) ABSTRACT

An optical converter for producing colored or white light from blue excitation light is provided. The converter has good scattering properties to be able to produce nearly white light from the scattered blue light components and the scattered, converted yellow light components. The optical converter includes material including one or more of a YAG ceramic, a LuAG ceramic, and a magnesium-aluminum ceramic exhibiting strong scattering.

24 Claims, 5 Drawing Sheets

Related U.S. Application Data

(60) Provisional application No. 61/614,061, filed on Mar. 22, 2012.

(51) Int. Cl.
*C04B 35/44* (2006.01)
*C09K 11/64* (2006.01)
*F21V 9/16* (2006.01)
*F21V 13/08* (2006.01)

(52) U.S. Cl.
CPC ...... *C09K 11/7706* (2013.01); *C09K 11/7721* (2013.01); *F21V 9/16* (2013.01); *F21V 13/08* (2013.01); *C04B 2235/3224* (2013.01); *C04B 2235/3225* (2013.01); *C04B 2235/3286* (2013.01); *C04B 2235/763* (2013.01); *C04B 2235/9653* (2013.01); *Y02B 20/181* (2013.01)

(56) References Cited

U.S. PATENT DOCUMENTS

| | | |
|---|---|---|
| 2008/0165523 A1 | 7/2008 | Schmidt et al. |
| 2008/0290362 A1 | 11/2008 | Zhang et al. |
| 2009/0034284 A1 | 2/2009 | Li et al. |
| 2009/0073591 A1 | 3/2009 | Chou |
| 2010/0067233 A1 | 3/2010 | Bechtel et al. |
| 2010/0085727 A1 | 4/2010 | Igarashi |
| 2011/0006329 A1 | 1/2011 | Fujita |
| 2011/0090696 A1 | 4/2011 | Nagai et al. |
| 2011/0116263 A1 | 5/2011 | Cillessen et al. |
| 2011/0186874 A1* | 8/2011 | Shum .................. H01L 25/0753 257/88 |
| 2012/0305844 A1 | 12/2012 | Emoto |

FOREIGN PATENT DOCUMENTS

| | | |
|---|---|---|
| CN | 102106003 A | 6/2011 |
| DE | 3026605 A1 | 2/1982 |
| DE | 19942014 A1 | 3/2001 |
| DE | 102005023134 A1 | 11/2006 |
| JP | 2003258308 A | 9/2003 |
| JP | 2005272486 | 10/2005 |
| JP | 2007273498 | 10/2007 |
| JP | 2009260234 | 11/2009 |
| JP | 2010092705 | 4/2010 |
| JP | 2010528467 | 8/2010 |
| JP | 2010238846 | 10/2010 |
| JP | 2011102004 | 5/2011 |
| JP | 2011515848 | 5/2011 |
| JP | 2011129354 | 6/2011 |
| JP | 2011174015 | 9/2011 |
| WO | 2006097876 A1 | 9/2006 |
| WO | 2007063460 A1 | 6/2007 |
| WO | 2009090580 | 7/2009 |
| WO | 2009094994 A1 | 8/2009 |
| WO | 2009115976 A1 | 9/2009 |
| WO | 2009132840 A2 | 11/2009 |
| WO | 2010010484 A1 | 1/2010 |
| WO | 2011097137 A1 | 8/2011 |
| WO | 2011097393 A1 | 8/2011 |

OTHER PUBLICATIONS

English Translation of the International Search Report dated Nov. 28, 2013 in corresponding International Application No. PCT/EP2012/071069.
English Translation of the Written Opinion dated Apr. 25, 2014 in corresponding International Application No. PCT/EP2012/071069.
English Translation of the International Preliminary Report on Patentability Apr. 29, 2014 in corresponding International Application No. PCT/EP2012/071069.

* cited by examiner

OPTICAL CONVERTER FOR HIGH LUMINANCES

This application is a continuation International Application No. PCT/EP2012/071069 filed Oct. 24, 2012, which claims the benefit of U.S. Provisional Application Ser. No. 61/614,061 filed Mar. 22, 2012, claims the benefit under 35 U.S.C. §119(a) of German Patent Application No. 10 2011 116 826.9 filed Oct. 25, 2011, and claims the benefit under 35 U.S.C. §119(a) of German Patent Application No. 10 2012 005 654.0 filed Mar. 22, 2012, the entire contents of all of which are incorporated herein by reference.

The invention relates to an optical converter for producing colored or white light, in which a converter medium converts shorter wavelength excitation light into longer wavelength converted light.

Due to absorption and emission processes in the converter material, the shorter wavelength excitation light is converted into remitted light of longer wavelength.

In the context of the invention, a converter refers to that part of a device for optical conversion in which conversion is effected. The converter comprises a converter material. Converter materials contain phosphors which are optically active media that cause the conversion. Converter materials can have different phosphor densities. The term "phosphor density" refers to the distribution of the phosphor or phosphor particles in the converter material. For example, the phosphor may be embedded in the converter in a passive matrix. But there are also converter materials in which the entire converter material functions as a phosphor.

Optical conversion always produces heat in the converter, due to so called Stokes losses. The Stokes losses are caused by the difference of photon energies of the excitation light and the emitted light. Typically, 20 to 30% of the optical power introduced is converted into heat. This is even true for converter materials with a quantum efficiency of 1. The introduction of heat into the converter leads to an increase in temperature of the converter material.

For several reasons, the high temperatures in the converter material lead to an attenuation or limitation of conversion and thus to a limitation of the luminances that can be achieved. The converter material may even be destroyed by the high temperatures. The failing temperature $T_{fail}$ is a material-specific property. That means, different materials may have different failing temperatures. The failing temperature significantly influences the maximum converter temperature $T_{conv}$, i.e. the maximum temperature at which the converter can be operated.

A limiting effect on the luminances that can be achieved in particular arises therefrom in converter systems in which the phosphor is embedded in a matrix of silicone or another organic binder. In so-called phosphor-in-silicone (PIS) converters, the failing threshold $T_{fail}$ is in a range from 100 to 120 CC.

Irrespectively from the failing threshold of the relevant converter materials employed, the effect of thermal quenching reduces quantum efficiency. Moreover, at elevated temperatures the absorption bands may be shifted to longer wavelengths, which will result in an increase in self-absorption and hence also a reduction of luminance.

In order to nevertheless obtain converters of high luminance, arrangements are known from prior art in which the converter material is disposed on a rotating disk. For example, U.S. patent application No. 2009/0073591 A1 describes a converter with a converter material applied on a rotating support wheel. The dynamic design allows to dissipate the heat output over a larger area and hence to comply with the limit temperature.

A similar arrangement is described in U.S. patent application No. 2009034284 A. A drawback of this approach, however, is that a support wheel necessarily has to be used and has an adverse effect on the size of the converter. In addition, the large support wheels require more material than for example a static arrangement. Moreover, the movable components may cause disturbing noise, or may wear out.

Therefore WO 09115976 A provides the use of a heat sink. In this case, the converter material is statically applied on a heat sink. This design is limited to converters operated in remission. Also, the heat dissipation that can be achieved depends on the thermal conductivity of the converter material employed.

Converter materials usually employed include phosphor-based materials, for example embedded in silicone or glass or quantum dots. In particular silicone-based converter materials exhibit low failing temperatures of about 100-120° C. and low thermal conductivities. In addition, when using phosphor particles in a matrix, the refractive index difference may only be varied to a limited extent by dopants and by the grain size of the phosphor particles. A consequence thereof is that absorption of the excitation light and scattering in the converter body cannot be adjusted independently.

The scattering properties of the converter material have an impact on both the scattering of the converted light and the scattering of the excitation light and therefore are important optical parameters.

For producing high luminances it is advantageous for the converted light to be emitted as completely as possible and with a small spatial emission spot. The emission spot is determined by the beam cross section of the excitation light, and luminance is determined by the emitted luminous flux per unit area of the converter surface. Because of the finite penetration depth of the excitation light and because of light scattering in the converter material, the emission spot will be greater than the beam cross section of the excitation light source. With strongly scattering converter material the emission spot will be smaller than with slightly scattering converter material, but will also depend on the converter thickness and on the reflective properties of the converter surface.

High luminance can be achieved with strongly scattering material. However, if the material is scattering to such an extent that even the excitation light is remitted before being absorbed, the fraction of converted light will decrease.

The invention is based on the object to provide a converter for producing white or colored light of high luminance.

The object of the invention is achieved by the subject matter of the present application, and embodiments and modifications are defined by the features.

The converter of the invention consists of a doped YAG ceramic or LuAG ceramic which are optoceramics with an embedded grain structure which defines conversion centers directly in the ceramic material. YAG ceramic is an yttrium aluminum garnet material, and LuAG ceramic is a lutetium aluminum garnet material. Doping with a cerium compound, e.g. $Ce_2O_3$, is particularly advantageous.

When using the optoceramics according to the invention as a converter material, high luminances of preferably more than 100 $cd/mm^2$, more preferably of more than 500 $cd/mm^2$ can be achieved.

For generating high luminances it is advantageous for the converted light to be emitted as completely as possible and with a small spatial emission spot. This may be achieved by a strongly scattering converter material. The grain structure of the invention achieves good scattering of both the shorter wavelength excitation light and the longer wavelength emission light. Strong scattering of the emission light generated in the converter is particularly advantageous for achieving good light confinement, i.e. a small emission spot.

If however the excitation light is remitted from the converter, the fraction of excitation light that enters the converter and is capable to contribute to conversion there will decrease. Therefore, with a given absorption length scattering must in turn not be so strong that remission of excitation light exceeds a desired level. Conversion efficiency is influenced both by the absorption of the excitation light, i.e. quantum efficiency, and by the remission of the excitation light.

However, in strongly scattering samples, i.e. in samples with high remission $R_{emission}$, conversion efficiency would be expected to decrease. This dependence is known from converter materials in which phosphor particles are provided in an optically inactive matrix. In converter materials which comprise phosphor particles in a silicone matrix, for example, a high density of phosphor particles in the silicone matrix results in high remission. However, a high density of phosphor particles causes an increase of remission of the excitation light. In order to maintain the intended absorption of the excitation light, the doping of the phosphor has to be increased. A result thereof is so-called concentration quenching, i.e. quantum yield and thus conversion efficiency is reduced. Therefore, it has not been possible so far to achieve high conversion efficiency and at the same time high remission $R_{emission}$. Surprisingly, the optoceramic of the invention exhibits high scattering and remission $R_{emission}$, at which the conversion efficiency is not yet adversely affected.

In particular, remission $R_{emission}$ is preferably at least 60%, more preferably at least 80%. This is advantageous, since high scattering is needed for sufficient light confinement and thus for a high luminance.

Furthermore, the converter material preferably exhibits a quantum efficiency QE of absorption of the excitation light of more than 80%, and more preferably of more than 90%. This is particularly advantageous since by virtue of a high quantum efficiency a smaller fraction of the irradiated energy is dissipated in form of heat. Thus, due to the good quantum efficiency of the converter material according to the invention heating is minimized, on the one hand.

On the other, light sources of lower light intensity can be used, which is advantageous in terms of energy consumption.

Since for achieving high luminances, high absorption of the excitation light and high remission of the converted emitted light are required, the product of remission $R_{emission}$ and quantum efficiency is in any case greater than 0.6 and preferably greater than 0.7.

According to the prior art, a ceramic material of particularly good quantum efficiency would be expected to exhibit low scattering (and therefore low remission $R_{emission}$).

Most surprisingly, by contrast, the converter material of the invention exhibits high scattering (and therefore high remission $R_{emission}$), without quantum efficiency already being adversely affected. Thus, the converter according to the invention has an optical figure of merit $FOM_{opt}$ of the converter defined as $$FOM_{opt} = QE * R_{emission},$$

which is greater than 0.6, preferably greater than 0.7, and most preferably greater than 0.8. In this case, quantum efficiency should be greater than 0.8. By contrast, the $FOM_{opt}$ expectable according to prior art are much smaller.

This exceptional and highly advantageous $FOM_{opt}$ is an intrinsic feature of the converter material according to the invention.

In one advantageous embodiment of the invention, the intension is to convert the entire excitation light if possible. Then the product of $QE*(1-R_{excitation})*R_{emission}$ has to be chosen as a parameter for conversion efficiency. In the advantageous embodiment of the invention, this parameter is therefore greater than 0.4, preferably greater than 0.6, and more preferably greater than 0.75. Such high parameters are possible in this embodiment of the invention because, surprisingly, by virtue of the converter material the absorption of excitation light can be adjusted largely independently from the scattering properties. For example, therefore, the absorption length of the converter according to the invention can be chosen to be smaller than typical scattering lengths.

In this way, by using an optoceramic according to the invention as a converter material it is possible by appropriate process control to adjust the scattering power of the material between highly transparent and highly opaque, regardless of the activator concentration.

Moreover, the optical properties may be selectively influenced by the initial composition and/or the doping degree. Thus, with the excellent thermal and thermo-optical properties of the optoceramics, converters with tailored properties are accessible that allow for high luminances.

In a static operation mode with luminous fluxes of more than 1000 lm, the converters according to the invention have high luminances of at least 100 cd/mm², preferably at least 500 cd/mm².

The thermo-optical properties of the converter material are summarized in a thermal figure of merit, FOM, $$FOM_{therm} = \text{thermal conductivity} * (\text{heat capacity/volume}) * \min(T_{fail}, T^{0.8}_{quench}).$$

The thermal FOM takes into account the heat conductivity and the maximum permissible thermal load of the converter material.

The failing temperature $T_{fail}$ is the temperature at which the converter material is destroyed.

When the temperature increases, quantum efficiency decreases due to thermal quenching. The threshold temperature $T^{0.8}_{quench}$ is defined as the temperature at which quantum efficiency is 80% of its value at room temperature.

Converters with a converter materials of high thermal FOM can therefore be operated at higher temperatures.

Since the maximum achievable pump power of the converter is limited by the maximum temperature of the converter, the maximum pump power may be deduced from the thermal FOM.

According to one advantageous embodiment of the invention, the converter material has a thermal FOM of greater than 500 (W/mK)*(J/cm³K)*K, preferably of greater than 800 (W/mK)*(J/cm³K)*K.

The exceptionally high thermal FOMs are possible due to the opto-thermal properties of the optoceramics used as the converter material.

It has been found that optoceramics exhibit high thermal conductivities, a high thermal failing threshold, and a high limit temperature. Optoceramics have highly favorable thermal conductivities, in particular the thermal conductivity is greater than 5 W/m*K, preferably greater than 8 W/m*K, and more preferably greater than 10 W/m*K.

The limit temperature of the relevant optoceramics is above 200° C., in particular above 250° C. Common converter materials such as phosphors-in-silicone, by contrast, have limit temperatures of about 100-120° C.

In ceramic converters, thermal conductivity of the crystallites dominates thermal conductivity of the entire converter. That means, grain boundaries or pores have an impact on scattering, but not on thermal conductivity of the converter.

So, according to the embodiment of the invention, converter materials may be obtained which have a thermal conductivity of at least 5 W/m*K, in particular of at least 8 W/m*K, and more preferably of at least 10 W/m*K.

In a preferred embodiment, the converter material is configured to be self-supporting. A self-supporting converter material in the sense of the invention refers to a material with a sufficient strength so that a substrate as a supporting material can be dispensed with.

This is particularly advantageous since so both of the outer faces of the converter may be coated. Because of the extraordinary high thermal stability, this is even possible at elevated temperatures.

In one advantageous embodiment of the invention, when operated in transmission, the converter material is coated on the excitation side with a dichroic filter which works as an edge filter. This filter is highly reflective for the spectral range of the converted light, while exhibiting the lowest possible reflection for the excitation light.

Operated in transmission here means that the excitation light is irradiated at one side of the sample and the converted light is used at the opposite side (exit face). The edge filter may be an anti-reflective (AR) filter that has an AR effect for the excitation light but acts as a mirror for the converted light. In this manner, the occurrence of Fresnel reflection losses and loss of converted light at the rear side can be reduced. At the exit face, a further, broadband AR filter may be applied.

In another embodiment, for use in remission, the converter material has an AR element on its emission face. In this case, in particular broadband AR coatings or AR structures such as moth-eye structures are used, which have an AR effect both on the excitation light and on the converted light.

In order to maximize luminance, the converter material of this embodiment preferably has a thickness from 0.1 to 1 mm, more preferably from 0.2 to 0.8 mm, and most preferably from 0.3 to 0.6 mm. Luminance is proportional to the absorption of excitation light and inversely proportional to the size of the emission spot. Thin converters minimize the enlargement of the emission spot.

The converter is chosen to be thin enough to minimize an enlargement of the scattering spot, while the thickness of the converter is sufficient to ensure effective absorption of the excitation light.

Another embodiment of the invention contemplates a static use of the converter. This is particularly advantageous, since in case of a static use of the converter large converter wheels need not be employed. With a small converter ring, material costs are low on the one hand, and on the other a more compact design of the converter is possible. Also, post-processing costs are lower when the converter is used as a static converter, in particular when the converter is made of a solid.

Preferably, in a static operation mode, the converter has a luminance of >>100 $cd/mm^2$. A static operation mode sets high requirements for the converter material, since the durations of local irradiation of the excitation light on the material are much longer than in case of a rotating converter wheel. In particular, the converter materials used must have high thermal conductivities in order to effectively dissipate the heat. Materials with poor thermal conductivity, in contrast, are likely to be thermally destroyed even after short exposure times, so they are not suitable for use in static converters. This applies for example to converter materials in which the optically active components are embedded in a passive matrix of glass or silicone.

This problem is solved by using the optoceramics according to the invention as a converter material. The converter material of the invention exhibits high thermal conductivity and has a high thermal failing threshold. In addition, the optoceramic is preferably attached to the substrate in a manner to be optimally coupled to a heat sink. The optoceramic may be directly bonded to the heat sink. This design is advantageous for converters that are operated in remission.

Another design provides for lateral attachment of the heat sinks to the optoceramic. In this case, the converter will be dimensioned and framed laterally in a manner to be optimally coupled to a heat sink without obstructing the light path of the converter. This design permits to employ a heat sink even for converters that are operated in transmission. In particular in case of low thermal stress, the use of a self-supporting converter disc may be advantageous.

In one advantageous embodiment of the invention, excitation of the converter material occurs in transmission. Accordingly, this is a converter excited from the rear face. Converters operated in transmission allow for a simpler optical design than converters operated in remission, since the path of the input beam and the path of the output beam of converted light are not interleaved with each other nor partially identical. However, the intensity of the excitation beam will be attenuated by the transmission through the converter material. Therefore, the light source employed has to provide a sufficient luminous flux. The high powers thereby resulting require converter materials with high maximum failing temperatures. Due to their advantageous thermal properties, the optoceramics of the invention are even suitable for use in converters operated in transmission.

According to one advantageous embodiment of the invention, the converter material is applied on a movable support.

A new type of projectors uses color wheels with conversion materials. These color wheels may be covered with segments of material of different emission wavelengths or may be designed for emission of light of a single wavelength. Preferably, the color wheel is made of a highly reflective metal. This promotes remission of the remaining excitation light and of the emitted light.

However, the cooling effect of the rotating color wheel is limited, because the design of the wheels is in particular intended to ensure remission and color multiplexing. Therefore, additional fans which produce a cooling air flow are typically used to cool the color wheel.

Preferably, the movable support of the embodiment is provided with blade and/or fan elements. In this manner the cooling of the wheel may be improved. Additionally, the wheel itself automatically provides for an air flow which may be controlled independently of the cooling by means of other components. In particular in the areas that are not covered by the optoceramic the wheel is provided with the elements mentioned above. For example, the blades may be placed in the center of the wheel, and/or the fan segments may be placed at the periphery of the color wheel. It is also possible to use the two elements in combination. The blades may especially be configured as radial or twisted radial blades. Also, fan blades or commercially available fans with optoceramic reflectors applied thereon may be used. The use of a self-ventilating support wheel is particularly advantageous if the converter material is not configured as a circular ring but as a circular disc. Circular discs can be used in particular when the conversion element does not need to provide for a color change. Possible applications include LCD projectors, LCOS projectors, or 3-chip DLP projectors, for example. A use in hybrid variants is also possible. Hybrid devices combine the generation of light by fluorescence conversion with directly emitting semiconductor sources.

The self-ventilating wheel is particularly advantageously used in applications that do not require synchronization of the color wheel with imaging. In this case, an unsynchronized fan motor may be used. However, the configuration of the self-ventilating wheel may also be used in segmented synchronized color wheels.

In another embodiment of the invention, remission of the excitation light is adjusted by the degree of doping of the optoceramic in a manner so that the excitation light is present in the remitted light spectrum.

In this way, by combining remission of the excitation light and secondary emission, a specific color impression of the emitted light may be produced. In particular it is possible to generate white light in this way. A high degree of doping, i.e. a high density of conversion centers in the optoceramic leads to a shortening of the absorption length relative to the scattering length. A high degree of doping results in a shortening of the absorption length. This may be adjusted by the cerium content, for example, and may be adjusted in a certain relation to the scattering length. If the absorption length is substantially shorter than the scattering length, mainly the converted light will be emitted. If, however, the absorption length is greater than the scattering length, mainly excitation light will be remitted. If, for example, the excitation light is blue and the secondary light is yellow, a regime can be adjusted in which the emitted converted light and the remitted excitation light in combination give a white color impression.

The converter according to the invention can be used in projectors, e.g. in projectors with DLP, 3-chip DLP, or LCD technology. Another potential application is the use in lamps with high luminance, for example in stage lights or car headlights. The use in lamps of high luminance and high spectral density such as used in spectroscopy, for example, is likewise possible.

DESCRIPTION OF THE FIGURES

The invention will now be described in more detail by way of exemplary embodiments and with reference to the accompanying drawings.

In the drawings.

The exemplary embodiments of the invention will now be described with reference to the figures.

Figure 1:
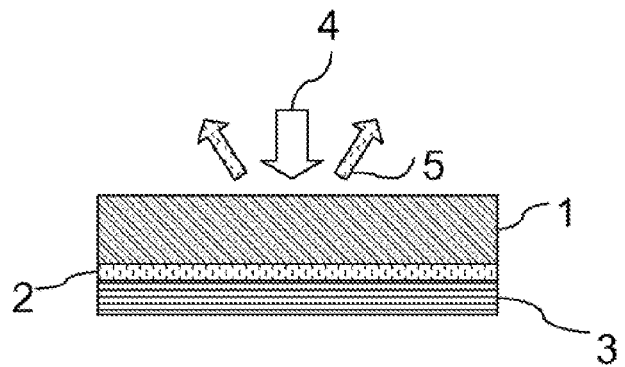
FIG. 1 schematically shows the configuration of a converter operated in remission, as a first exemplary embodiment.

FIG. 1 schematically shows a side view of the configuration of a converter operated in remission, as a first exemplary embodiment.

The converter comprises an optoceramic converter body 1 and a mirror 3 which are joined to each other by an adhesive layer 2. The converter material, i.e. the optoceramic, is a doped YAG ceramic or a LuAG ceramic and defines a grain structure with strong scattering.

From above, i.e. from the excitation side, blue excitation light 4 of high power density, i.e. with a small light beam cross section is incident upon the excitation face of converter body 1, and upon penetration into the optoceramic longer wavelength light 5 is generated by conversion and is emitted to the outside by scattering, as indicated by arrows.

Adhesive layer 2 has a thickness $d_{adh}$ of 10 μm, for example. Mirror 3 reflects the excitation light 4 into optoceramic 1 and thus enhances luminous efficacy of the converted, longer wavelength light 5.

Converter area A is 4 mm², for example, and the converter has a thickness $d_{conv}$ of 200 μm. The maximum pump power can be approximated as:

$$P^{max}_{opt} \sim 4(T^{max}_{conv} - T_{RT})/R^{th}$$

with:

$$T^{max}_{conv} = T_{RT} + Q/A * d/\lambda$$

with $R^{th} = d/(A\lambda)$ being the thermal resistance and $\lambda$ the thermal conductivity of the converter.

Thermal conductivity of optoceramic $\lambda_{OC} = 10$ W/mK.
Thermal conductivity of adhesive $\lambda_{adh} = 0.3$ W/mK.

The thermal resistance of the converter results from the absolute thermal resistances $R^{th}$ of the converter material and of the adhesive used.

Thus, with thermal resistances of the optoceramic of $R^{th}_{OC} = 5$ K/W and of the adhesive layer of $R^{th}_{adh} = 8.3$ K/W, a thermal resistance of the converter $R^{th}_{conv}$ of 13.3 K/W is resulting. Adhesive layer 2 has a higher thermal resistance than optoceramic 1 and therefore largely determines the thermal resistance, i.e. the lower limit thereof, in this case.

With a failing threshold of the optoceramic of $T^{max}_{OC} = 250°$ C., a maximum pump power $P^{max}_{opt}$ of 68 W is resulting. Only the adhesive layer has a limiting effect.

With a failing threshold of the adhesive of 100° C., a maximum optical pump power of $P^{max}_{opt} = 36$ W is yet resulting.

With an irradiation with 10 W upon 4 mm², for example, this surprisingly high pump power allows for luminances of 200 cd/mm² and for a luminous flux of 600 lm.

By comparison, converters known from prior art based on a phosphor in silicone (PIS) can achieve maximum optical pump powers $P^{max}_{opt}$ of about 3 W. This is in particular due to the high thermal resistance $R^{th}_{PIS}$ of about 100 K/W and the low failing threshold of the PIS converter material.

Figure 2:
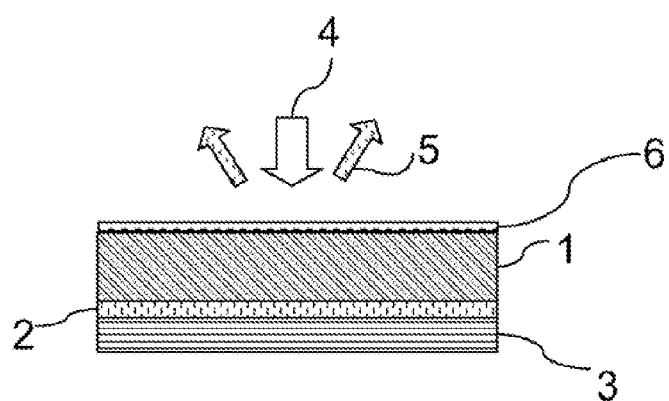
FIG. 2 schematically shows the configuration of a modification of the first exemplary embodiment including a dichroic filter.

FIG. 2 schematically shows the configuration of the second exemplary embodiment which is a variation of the first exemplary embodiment, in which additionally an anti-reflective coating 6 was applied on optoceramic 1. This reduces reflection of the excitation beam 4 at the surface of optoceramic 1 and improves emission of scattered converted light 5.

Figure 3:
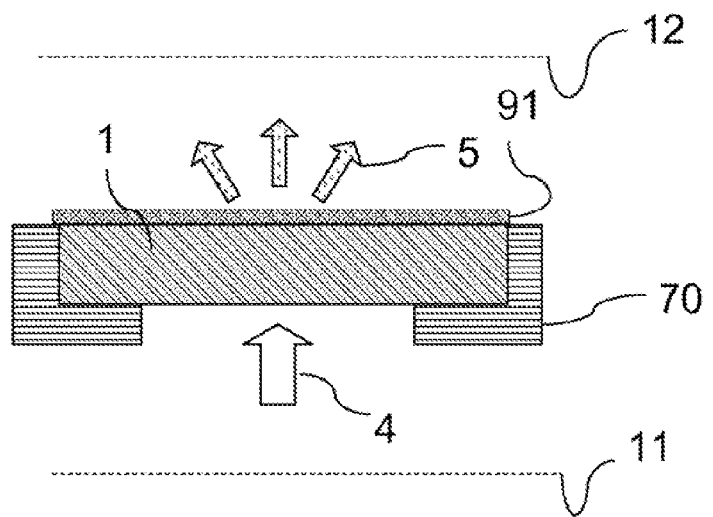
FIG. 3 schematically illustrates the use of the optoceramic in a converter operated in transmission, as a third exemplary embodiment.

FIG. 3 shows the configuration of the third exemplary embodiment, a converter excited from the rear side, i.e. with transmissive excitation. The excitation light 4 is incident on optoceramic 1 at excitation side 11. The converted longer wavelength light 5 exits to emission side 12. Optoceramic 1 has a thickness of 200 micrometers. This ensures sufficiently high transmission with good quantum efficiency. In this example, optoceramic 1 is fixed only laterally, i.e. left and right of the light spot of excitation light, by a metallic frame 70. Thus, the major part of optoceramic 1 hangs freely between the frame. This design is only made possible by the fact that the optoceramic 1 is self-supporting. By contrast, in systems known from prior art, such as PIS substrates, a support material is needed, so that rear excitation is not possible. Frame 70 is designed as a heat sink and has a diameter of 2 mm. In order to reduce the size of the emission spot, optoceramic 1 is coated with an edge filter 91 on emission side 12. On excitation side 11, in turn, optoceramic 1 is coated with a broadband AR coating.

Figure 4:
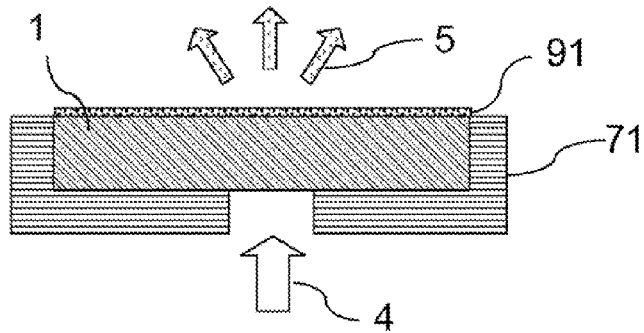
FIG. 4 schematically illustrates a converter operated in transmission and with an improved frame, as a fourth exemplary embodiment.

The configuration schematically shown in FIG. 4 is a modification of the third exemplary embodiment. Here optoceramic 1 is framed in a manner so that frame 71 covers a major part of the bottom surface of optoceramic 1, apart from the area on which the light spot of excitation light 4 is incident. Frame 71 is metallic and reflects light scattered in optoceramic 1, including excitation light 4 and converted light 5. In this way, luminous efficacy in the optoceramic is increased. Therefore, an additional coating of optoceramic 1 on the excitation side 11 can be dispensed with in this case.

Assuming the same material parameters as in the first exemplary embodiment, the effective thermal resistance $R^{th}_{eff}$ resulting is 55 K/W. This permits optical pump powers $P^{max}_{opt}$ of up to 16 W.

The difference to the optical pump powers of the first exemplary embodiment is caused by the configuration.

Depending on the operating configuration, the performance here additionally depends on geometry factors, for example. A result thereof is that the maximum pump power in transmission is lower than in remission.

The table below gives an overview of the data relevant for the thermal FOM of a static converter, for converter material according to the invention, OC1 and OC2, and for converter materials based on silicone or glass/glass-ceramic.

The thermal FOM for a statically operated converter has been defined as the product of the maximum allowable temperature and thermal conductivity.

Converters according to the invention exhibit an $FOM_{stat}$ of up to 7322 W/m, prior art phosphor-in-silicone converters with a similar configuration, by contrast, only exhibit an FOM of 95 W/m.

In the last column, the FOM was supplemented by a heat capacity figure. The heat capacity figure is the product of heat capacity and density. The FOM extended in this manner, $FOM_{dyn}$, describes the behavior of a converter on a rotating wheel, and thus a dynamic converter.

Optoceramics OC1 and OC2 of the invention exhibit extremely high FOMs.

The two optoceramics OC1 and OC2 differ in their doping. Optoceramic OC1 comprises YAG (yttrium aluminum garnet), optoceramic OC2 comprises $Mg_3Al_8[SiO]_3$.

However, the differences in FOM of the two optoceramics are in particular attributable to different densities.

In terms of the FOM, the materials listed in the table can be divided into three groups. The low FOMs of the silicone matrix based converters are in particular attributable to the low thermal conductivity.

Glass or glass ceramic based materials exhibit FOMs which are significantly higher than those based on silicone matrices, i.e. on organic systems. However, the FOMs of the optoceramics according to the invention are more than 5 times as high as those of glass ceramic based converters.

In particular, the optoceramics advantageously exhibit exceptionally high thermal conductivities λ.

TABLE 1

Overview of FOM relevant parameters

| Material | Cp [J/K * g] | Cp * p [J/cm³K] | λ [W/mK] | TQE/80 [° C.] | $T_{abs}$ [° C.] | Min (TQE80/$T_{abs}$) | $FOM_{stat}$ [W/m] | $FOM_{dyn}$ [J²/cm⁴sK] |
|---|---|---|---|---|---|---|---|---|
| OC1 | 0.6 | 2.76 | 14 | 250 | 1700 | 523 | 7322 | 202 |
| OC2 | 0.6 | 2.28 | 10 | 250 | 1700 | 523 | 5230 | 119 |
| Silicone | 1.4 | 1.7 | 0.2 | 220 | 200 | 473 | 95 | 1.6 |
| Glass | 1 | 2.5 | 0.9 | 300 | 500 | 573 | 443 | 11.1 |
| Glass ceramic | 1 | 2.5 | 1.5 | 250 | 900 | 523 | 859 | 22 |

Figure 5:
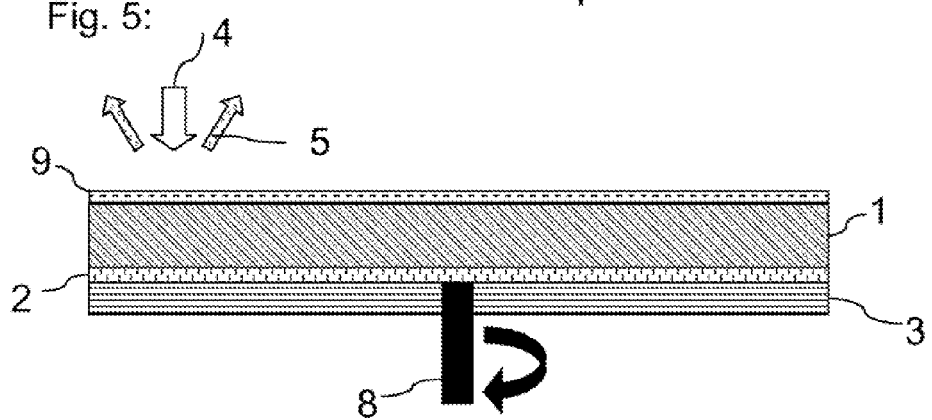
FIG. 5 schematically illustrates the configuration of a dynamic, i.e. rotating, converter operated in remission, in which the optoceramic is formed as a disc.

The fifth exemplary embodiment shown in FIG. 5 schematically illustrates the cross section of a dynamic converter which is operated in remission. Optoceramic 1 is formed as a circular disc and is applied to support 3 by adhesive layer 2. The surface of optoceramic 1 is coated with an edge filter 9. In its center, support 3 is coupled to a hub 8. Excitation is localized at one point of the converter. By means of hub 8, support 3 with optoceramic 1 is rotated. Thus, a predetermined localized area of optoceramic 1 is irradiated by the excitation light 4 for only a short duration. The duration of local irradiation may be set via the rotary frequency of hub 8. Because of the short duration of local irradiation, high excitation powers of far more than 25 W can be obtained.

Figure 6:
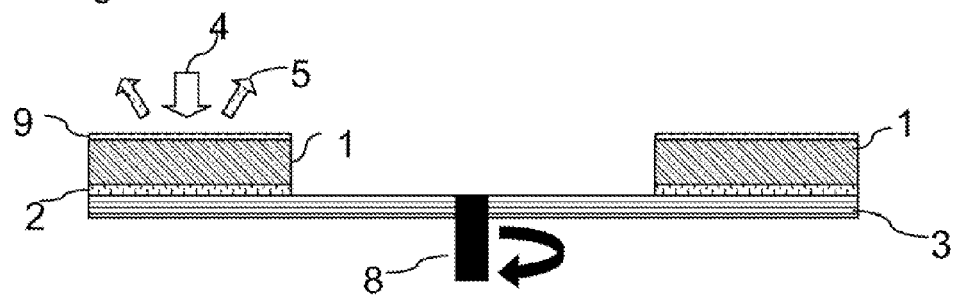
FIG. 6 schematically illustrates the configuration of a dynamic, i.e. rotating, converter operated in remission, in which the optoceramic 1 is formed as a ring.

In the exemplary embodiment schematically illustrated in FIG. 6, the optoceramic 1 has an annular shape and is applied on circular support 3 by means of adhesive layer 2. By using an annular optoceramic 1, material costs can be reduced without affecting the optical properties of the converter. This is possible because in this embodiment only those portions have been eliminated which are not covered by the excitation beam 4 anyway.

Figure 7:
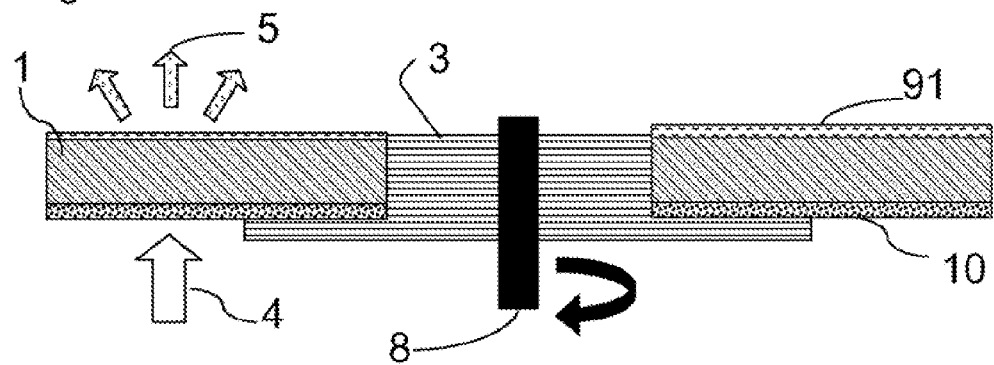
FIG. 7 schematically illustrates the configuration of a dynamic converter operated in transmission.

FIG. 7 schematically illustrates a dynamic, i.e. rotating converter operated in transmission. The disc-shaped support 3 fixes the annular optoceramic 1 which is configured as a reflective frame. Here, support 3 only covers a portion of the bottom surface of optoceramic 1 that is necessary for fixing it. The major part of the bottom surface of the optoceramic is not covered by support 3 and can thus be used for conversion.

Here, again, optoceramic 1 is provided with an AR coating 10 on the excitation side, i.e. on its bottom surface, and with an edge filter 91 on its upper surface.

Figure 8:
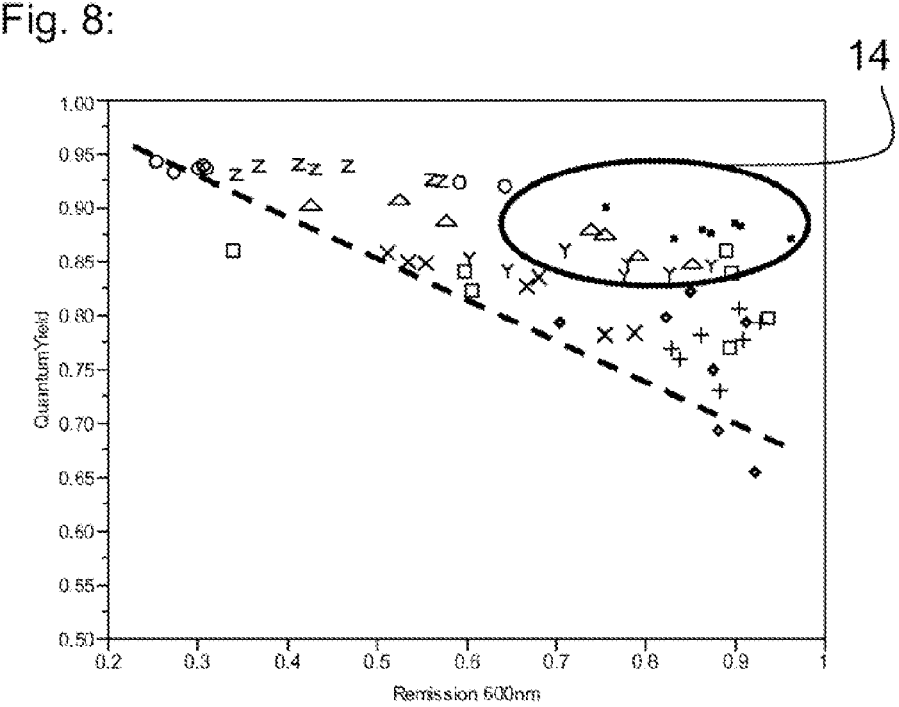
FIG. 8 is a graph illustrating the dependence of quantum efficiency and remission.

FIG. 8 shows the relationship between quantum efficiency and remission. However, the relationship between scattering and remission can advantageously be used to quantify the scattering properties of a converter. For this purpose, the remission is measured at a wavelength above the excitation wavelength. In this case, the remission of a sample of the converter material of a thickness of 1 mm was measured at a wavelength of 600 nm. The spectrometer used was a spectrometer with an integration sphere. Below, the remission $R_{emission}$ measured according to these measurement rules is representative of an optical measurement of scattering properties. The remission was measured on a sample of a thickness of 1 mm at a wavelength of 600 nm. Here, a strongly scattering material exhibits high remission.

In strongly scattering samples the quantum efficiency is expected to drop. The expected behavior is indicated in the chart by a straight line.

Most surprisingly, however, a regime 14 was found for which the samples exhibit high remission without causing a significant decrease in quantum efficiency.

Thus, optoceramics have been created which exhibit a remission at 600 nm from 0.7 to 0.95, and which have a quantum efficiency of more than 0.85.

Figure 9:
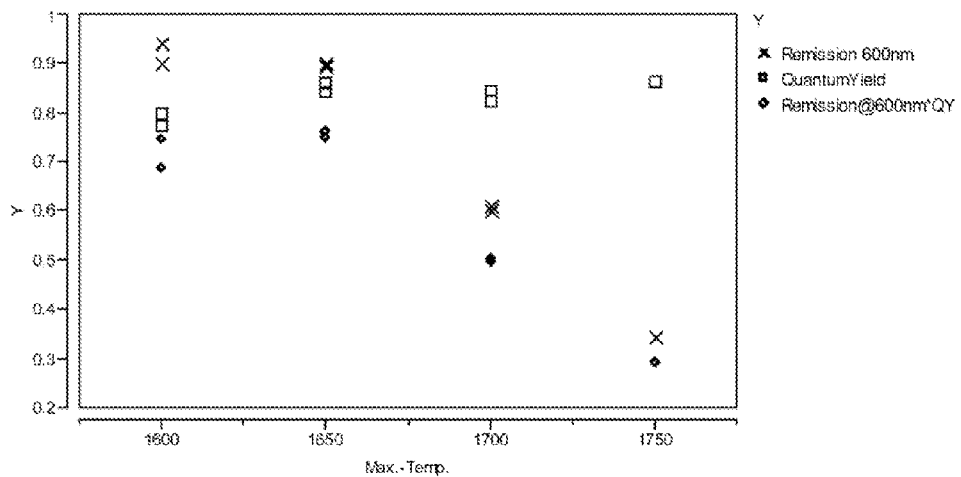
FIG. 9 is an overlay graph illustrating the dependence of remission and quantum efficiency on the sintering temperature of an optoceramic of a composition $Lu_3(Ga,Al)_5O_{12}$—Ce.
Figure 10:
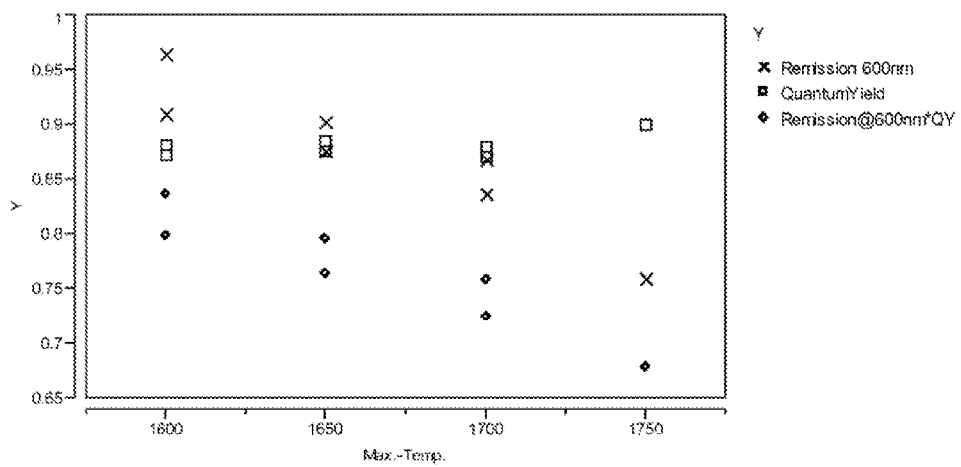
FIG. 10 is an overlay graph illustrating the dependence of remission and quantum efficiency on the sintering temperature of an optoceramic of a composition $Y_3Al_5O_{12}$—Ce.

These extraordinary property of the inventive optoceramics is a result of a specific composition of the initial mixture and of production conditions. Surprisingly, it has been found that the scattering of the optoceramics can be adjusted by the choice of the sintering temperature. This will be explained hereinafter with reference to the examples shown in FIG. 9 and FIG. 10. FIG. 9 and FIG. 10 illustrate the dependence of remission, quantum efficiency, and of the product of remission and quantum efficiency of two cerium-doped optoceramics of different composition.

FIG. 9 shows an overlay chart of an optoceramic of a composition $Lu_3(Ga,Al)_5O_{12}$—Ce, the optoceramic in FIG. 10 has a composition of $Y_3Al_5O_{12}$—Ce.

In both cases, remission is a function of sintering temperature, while for quantum efficiency there is only a weak dependence. This is particularly evident from FIG. 9.

For example, an increase in sintering temperature by 100° C. results in a halving of remission, while quantum efficiency remains almost constant.

As shown in FIG. 10, this effect is much less pronounced with the second optoceramic.

The extent of the effect may especially depend on the composition of the starting material. For example, the relationship of the two parameters depends on the density of conversion centers, i.e. on the degree of doping.

Figure 11:
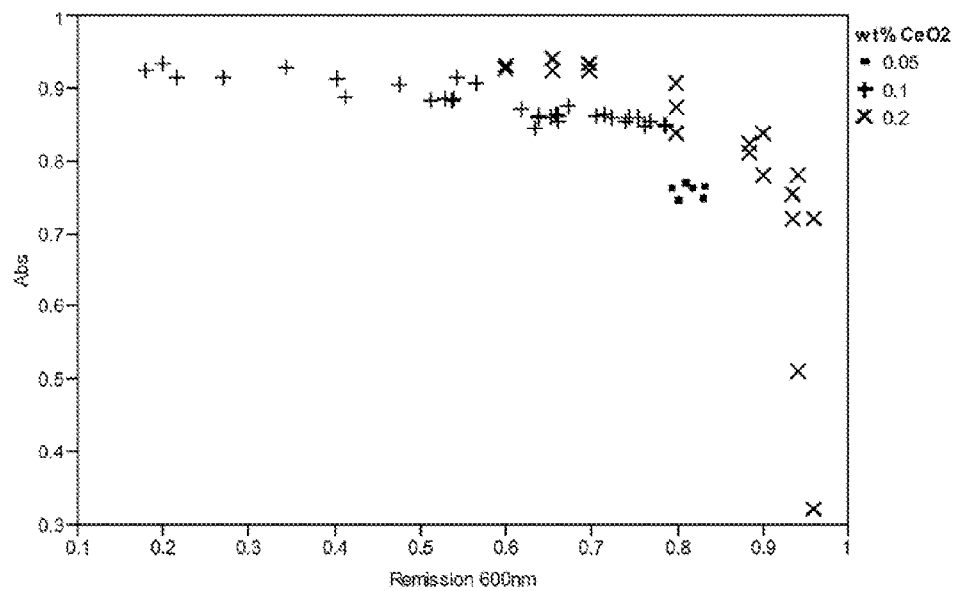
FIG. 11 is a graph illustrating the dependence of remission on the cerium content.

FIG. 11 shows the relationship between absorption efficiency and remission or scattering of optoceramics according to the invention having different degrees of doping of $Ce_2O_3$.

Absorption efficiency refers to the fraction of absorbed excitation light of the incident excitation light. It is calculated according to $1-R_{excitation}$ from the remission of blue excitation light. The remission of blue excitation light was measured on samples of 1 mm thickness in a quantum efficiency measurement station.

Optoceramics with high doping levels (0.2 wt % $Ce_2O_3$) show a strong dependence of absorption efficiency and remission. Especially at high remission values of 0.8 and more, absorption efficiency decreases rapidly.

It has been shown that the absorption efficiency for blue light, or blue remission, $R_{excitation}$, can be adjusted within wide limits by adjusting scattering or yellow remission $R_{emission}$.

By adjusting scattering largely independently from quantum efficiency, a good light confinement and thus high luminances can be achieved on the one hand.

On the other, it is possible to adjust scattering in a manner so that a combination of remitted excitation radiation $R_{excitation}$, and converted light emission results in a certain color impression which falls on the conversion line in the chromaticity diagram. The conversion line is the line connecting the color coordinates of the excitation light and the color coordinates of the emission spectrum.

Figure 12:
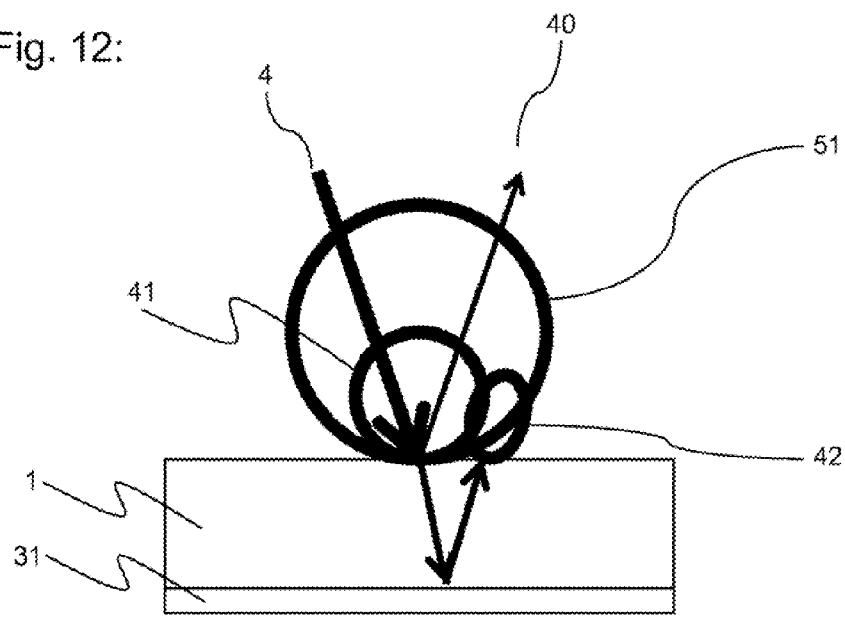
FIG. 12 illustrates a converter and the adjusting of a defined fraction of excitation light for generating a white field-near point in the chromaticity diagram.

Referring to FIG. 12, another exemplary embodiment will be described which allows for adjusting a white field-near point in the color spectrum diagram. For operation in remission the converter 1 is provided with a mirror 31. In order to arrive near the white field on the conversion line in the color spectrum diagram, the converter 1 is selected with respect to its scattering properties such that 20% of the blue excitation light is remitted and 80% is absorbed. The absorbed fraction of excitation light is predominantly converted into yellow light and is emitted either directly or after having been reflected at mirror 31, as a scattering lobe 51.

The blue remitted light is composed of a Fresnel reflection 40 and a scattering lobe 41. This scattering lobe 41 has a Lambertian radiation pattern.

Shifting of the white field-near point is now effected by adjusting the converter thickness. If the latter is so small that excitation light is reflected at mirror 31 to re-exit at the surface, a second scattering lobe 42 is produced. This second scattering lobe 42 will have a more or less directional radiation pattern, depending on the converter thickness and the scattering. A result of the superposition of scattering lobes 40, 41, 42 of the excitation light and scattering lobe 51 of the converted light is an angular dependence of the color impression.

The angular dependence can be reduced by roughening the surface of the converter.

An alternative of fine-tuning to obtain the white field-near point is to apply a thin scattering layer on the excitation face of converter 1. The scattering layer may for example consist of $TiO_2$ or of non-doped optoceramic material. In both cases, the blue fraction of the emitted light is increased relative to the yellow fraction thereof.

In order to arrive in the white field of the chromaticity diagram, the yellow light may be depleted from green fractions by filtering. This may be achieved, for example, by a dichroic mirror which reflects the blue light but transmits the incident green light, so that the latter will not exit on the utilization side of the converter.

The converter materials according to the invention exhibit tailored thermal, thermo-optical, and optical properties.

Synergetic interaction of these properties provides for very high luminances of more than 100 $cd/mm^2$.

The invention claimed is:

1. A converter for producing colored or white light from blue excitation light, comprising:

a converter body having an excitation face and an opposite face, the spacing therebetween defining the thickness of the converter body, the converter body comprising a cerium doped optoceramic converter material selected from the group consisting of a YAG ceramic, a LuAG ceramic, and a magnesium-aluminum ceramic, wherein the optoceramic converter material has a degree of cerium doping and is sintered at a temperature that are sufficient to provide an embedded grain structure in the doped optoceramic material which exhibits scattering to obtain an emission spot of a common size as a cross section of a light beam of the excitation light, to obtain a remission factor of longer wavelength light of 600 nm wavelength of $R_{emission}>0.6$, and to obtain a quantum efficiency QE of greater than 0.80.

2. The converter as claimed in claim 1, wherein the thickness of the converter body is used for fine-tuning fractions of remitted excitation light and remitted longer wavelength light.

3. The converter as claimed in claim 1, wherein the optoceramic converter material is a doped YAG ceramic comprising cerium doped $Y_3Al_5O_{12}$.

4. The converter as claimed in claim 1, wherein the optoceramic converter material is a LuAG ceramic comprising cerium doped $Lu_3(Ga,Al)_5O_{12}$.

5. The converter as claimed in claim 1, wherein the optoceramic converter material is a magnesium-aluminum ceramic comprising cerium doped $Mg_3Al_8[SiO]_3$.

6. The converter as claimed in claim 1, wherein the optoceramic converter material is doped with an amount of $Ce_2O_3$ in a range from 0.01 to 2%.

7. The converter as claimed in claim 1, wherein the optoceramic converter material is doped with an amount of $Ce_2O_3$ in a range from 0.3 to 1%.

8. The converter as claimed in claim 1, wherein the optoceramic converter material is doped with an amount of $Ce_2O_3$ in a range from 0.1 to 0.5%.

9. The converter as claimed in claim 1, wherein the thickness of the converter body is 1 mm thickness.

10. The converter as claimed in claim 1, further comprising an optical figure of merit of $QE*R_{emission}>0.6$.

11. The converter as claimed in claim 1, wherein the optoceramic converter material has a thermal figure of merit $(FOM_{therm,stat})>1000$ (W/m), and wherein said thermal figure of merit is calculated as $FOM_{therm}$=thermal conductivity*$min(T_{fail}, T^{0.8}_{quench})$.

12. The converter as claimed in claim 1, wherein the optoceramic converter material has a thermal conductivity of at least 5 W/m*K.

13. The converter as claimed in claim 1, wherein the optoceramic converter material has a thermal conductivity of at least 10 W/m*K.

14. The converter as claimed in claim 1, wherein the optoceramic converter material has a thermal conductivity of at least 12 W/m*K.

15. The converter as claimed in claim 1, further comprising a luminance of $>>100$ cd/mm$^2$ in a static operation mode.

16. The converter as claimed in claim 1, further comprising a mirror secured to the opposite face.

17. The converter as claimed in claim 1, wherein the excitation face is coated with a dichroic filter.

18. The converter as claimed in claim 1, comprising scattering properties that remit between 10% and 30% of the excitation light that, in combination with the excitation light, converted light leads to a white color impression for the viewer.

19. The converter as claimed in claim 1, further comprising a scattering layer at the excitation face to provide scattering properties that remit between 10% and 30% of the excitation light that achieves a white light-near region.

20. The converter as claimed in claim 1, wherein the excitation face is roughened to provide scattering properties that remit between 10% and 30% of the excitation light that achieves a white light-near region.

21. A converter for producing colored or white light from blue excitation light, comprising:
a converter body having an excitation face and an opposite face, the spacing therebetween defining the thickness of the converter body, wherein the converter material comprises a cerium doped optoceramic having a degree of cerium doping and being sintered at a temperature that are sufficient to provide an embedded grain structure in the doped optoceramic which exhibits scattering to obtain an emission spot of a common size as the cross section of the light beam of the excitation light, to obtain a remission factor of longer wavelength light of 600 nm wavelength of $R_{emission}>0.6$, and to obtain a quantum efficiency QE of greater than 0.80, wherein the converter material is a doped YAG ceramic or LuAG ceramic.

22. A converter comprising a ceramic converter material having a cerium doped optoceramic that has a degree of cerium doping and is sintered at a temperature that are sufficient to provide an embedded grain structure in the doped optoceramic so that the ceramic converter material exhibits an optical figure of merit of $FOM_{opt}=QE*R_{emission}$ that is greater than 0.5, wherein the QE is a quantum efficiency and the $R_{emission}$ is a remission factor of longer wavelength light of 600 nm wavelength.

23. The converter as claimed in claim 22, wherein the optical figure of merit of $FOM_{opt}=QE*R_{emission}$ that is greater than 0.7.

24. The converter as claimed in claim 22, wherein the optical figure of merit of $FOM_{opt}=QE*R_{emission}$ that is greater than 0.8.

* * * * *